US011516087B2

(12) United States Patent
Towles

(10) Patent No.: US 11,516,087 B2
(45) Date of Patent: Nov. 29, 2022

(54) CONNECTING PROCESSORS USING TWISTED TORUS CONFIGURATIONS

(71) Applicant: Google LLC, Mountain View, CA (US)

(72) Inventor: Brian Patrick Towles, Chapel Hill, NC (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/120,051

(22) Filed: Dec. 11, 2020

(65) Prior Publication Data
US 2022/0173973 A1    Jun. 2, 2022

Related U.S. Application Data

(60) Provisional application No. 63/119,329, filed on Nov. 30, 2020.

(51) Int. Cl.
H04L 12/24    (2006.01)
H04L 29/08    (2006.01)
(Continued)

(52) U.S. Cl.
CPC .............. H04L 41/12 (2013.01); H04L 49/10 (2013.01); H04L 49/15 (2013.01); H04L 67/10 (2013.01)

(58) Field of Classification Search
CPC ......... H04L 41/12; H04L 49/10; H04L 49/15; H04L 67/10
(Continued)

(56) References Cited

U.S. PATENT DOCUMENTS 4,910,665 A    3/1990 Mattheyses et al.
5,689,661 A    11/1997 Hayashi et al.
(Continued)

FOREIGN PATENT DOCUMENTS

BR    112018002502 B1 *    9/2021    ............. A23L 19/12
BR    112015009668 B1 *    10/2021    ............. G06F 16/21
(Continued)

OTHER PUBLICATIONS

Ammendola et al., "APEnet+: a 3D Torus network optimized for GPU-based HPC Systems," Journal of Physics: Conference Series, 2012, 396(4)042059.
(Continued)

Primary Examiner — David R Lazaro
Assistant Examiner — Berhanu Shitayewoldetadik
(74) Attorney, Agent, or Firm — Fish & Richardson P.C.

(57) ABSTRACT

Methods, systems, and apparatus, including computer programs encoded on computer-storage media, for connecting processors using twisted torus configurations. In some implementations, a cluster of processing nodes is coupled using a reconfigurable interconnect fabric. The system determines a number of processing nodes to allocate as a network within the cluster and a topology for the network. The system selects an interconnection scheme for the network, where the interconnection scheme is selected from a group that includes at least a torus interconnection scheme and a twisted torus interconnection scheme. The system allocates the determined number of processing nodes of the cluster in the determined topology, sets the reconfigurable interconnect fabric to provide the selected interconnection scheme for the processing nodes in the network, and provides access to the network for performing a computing task.

18 Claims, 9 Drawing Sheets

8x4 Twisted Torus Configuration
- Twisted Torus
- Two 4x4 sub-meshes
- Y-dimension wraparound links have a X-dimension offset of +4
- Network Diameter: 4 hops
- Topology is symmetric

(51) Int. Cl.
   *H04L 12/933* (2013.01)
   *H04L 12/751* (2013.01)
   *H04L 12/44* (2006.01)
   *G06F 15/16* (2006.01)
   *H04L 41/12* (2022.01)
   *H04L 49/10* (2022.01)
   *H04L 49/15* (2022.01)
   *H04L 67/10* (2022.01)

(58) Field of Classification Search
   USPC .......................................................... 709/201
   See application file for complete search history.

(56) References Cited

U.S. PATENT DOCUMENTS

| | | | |
|---|---|---|---|
| 6,230,252 B1* | 5/2001 | Passint | G06F 15/17381 712/12 |
| 6,718,428 B2 | 4/2004 | Lee et al. | |
| 7,555,566 B2 | 6/2009 | Blumrich et al. | |
| 7,873,811 B1 | 1/2011 | Wolinski et al. | |
| 8,159,973 B2* | 4/2012 | Deng | G06F 15/803 370/254 |
| 8,306,042 B1 | 11/2012 | Abta | |
| 8,341,381 B2* | 12/2012 | Pechanek | G06F 15/8023 712/13 |
| 9,590,629 B2 | 3/2017 | Nicol | |
| 10,374,605 B2 | 8/2019 | Nicol | |
| 10,430,375 B2* | 10/2019 | Ajima | G06F 15/803 |
| 10,644,943 B1* | 5/2020 | Sidebottom | H04L 41/145 |
| 2002/0069343 A1* | 6/2002 | Pechanek | G06F 15/17381 712/11 |
| 2002/0109879 A1* | 8/2002 | Wing So | H04Q 11/0005 398/58 |
| 2002/0176648 A1* | 11/2002 | Bhat | G02B 6/3588 385/15 |
| 2003/0023749 A1* | 1/2003 | Lee | H04L 45/00 709/240 |
| 2003/0046512 A1 | 3/2003 | Loki et al. | |
| 2003/0088754 A1* | 5/2003 | Barry | G06F 15/8023 712/15 |
| 2003/0202530 A1 | 10/2003 | Jenkins et al. | |
| 2004/0004963 A1* | 1/2004 | Mehra | H04L 45/583 370/392 |
| 2004/0103218 A1* | 5/2004 | Blumrich | G06F 9/526 709/249 |
| 2004/0168040 A1* | 8/2004 | Pechanek | G06F 15/8023 712/15 |
| 2005/0132163 A1* | 6/2005 | Stockmeyer | G06F 15/17381 712/11 |
| 2005/0195488 A1* | 9/2005 | McCabe | G02B 5/085 359/603 |
| 2006/0109842 A1* | 5/2006 | Thiele | G06F 15/8007 370/469 |
| 2008/0031238 A1* | 2/2008 | Harmelin | H04L 41/0843 370/389 |
| 2009/0094436 A1* | 4/2009 | Deng | G06F 15/803 712/E9.003 |
| 2009/0259713 A1* | 10/2009 | Blumrich | G06F 15/17381 714/E11.178 |
| 2012/0109830 A1* | 5/2012 | Vogel | G06Q 30/06 705/64 |
| 2012/0311299 A1* | 12/2012 | Blumrich | F04D 25/166 712/16 |
| 2013/0019082 A1* | 1/2013 | Pechanek | G06F 15/17381 712/16 |
| 2014/0098702 A1* | 4/2014 | Fricker | H04L 12/28 370/254 |
| 2014/0181573 A1* | 6/2014 | Goss | H04L 45/021 710/305 |
| 2014/0321324 A1* | 10/2014 | Beshai | H04L 49/103 370/254 |
| 2015/0172218 A1* | 6/2015 | Beshai | H04J 14/0209 370/401 |
| 2015/0256410 A1* | 9/2015 | Beshai | H04L 49/15 370/254 |
| 2017/0099190 A1* | 4/2017 | Pitwon | H05K 7/1489 |
| 2017/0364702 A1* | 12/2017 | Goldfarb | H04L 63/10 |
| 2017/0366416 A1* | 12/2017 | Beecham | H04L 45/50 |
| 2017/0366469 A1* | 12/2017 | Lagerholm | G06F 9/5083 |
| 2018/0054475 A1* | 2/2018 | Agarwal | H04L 69/40 |
| 2018/0367652 A1* | 12/2018 | Dixit | H04L 67/535 |
| 2019/0266790 A1* | 8/2019 | Song | G06T 15/08 |
| 2019/0286440 A1* | 9/2019 | Leonard | G06F 8/76 |
| 2019/0364009 A1* | 11/2019 | Joseph | H04L 67/303 |
| 2020/0110591 A1* | 4/2020 | Buczkowski | G06F 8/62 |
| 2020/0160171 A1 | 5/2020 | Rangarajan et al. | |
| 2020/0186607 A1* | 6/2020 | Murphy | H04L 9/0637 |
| 2020/0220787 A1* | 7/2020 | Chen | G06F 15/17387 |
| 2020/0311017 A1 | 10/2020 | Knowles | |
| 2021/0111959 A1* | 4/2021 | Shahriar | H04L 41/40 |
| 2021/0159659 A1* | 5/2021 | Bandyopadhyay | G02B 6/12007 |
| 2021/0160318 A1* | 5/2021 | Sajeepa | G06F 3/0688 |
| 2021/0314404 A1* | 10/2021 | Glek | H04L 67/1004 |
| 2021/0344618 A1* | 11/2021 | Zheng | H04L 12/44 |
| 2022/0121928 A1 | 4/2022 | Dong et al. | |

FOREIGN PATENT DOCUMENTS

| | | | | |
|---|---|---|---|---|
| CN | 107971830 B | * | 4/2022 | ......... B23Q 17/22 |
| DE | 102020125219 A1 | * | 6/2021 | ......... H04L 41/0816 |
| EP | 3062233 A2 | * | 8/2016 | ....... G06F 15/17387 |
| JP | 3980488 B2 | * | 9/2007 | ........... F04D 25/166 |
| NL | 2023381 B1 | * | 2/2021 | ......... A41D 13/0056 |
| WO | WO-9926429 A2 | * | 5/1999 | ......... G06F 15/17381 |
| WO | WO-2004021643 A1 | * | 3/2004 | ......... G06F 15/7867 |
| WO | WO-2008157499 A1 | * | 12/2008 | ......... G02B 6/4246 |
| WO | WO 2011/140028 | | 11/2011 | |
| WO | WO-2015176243 A9 | * | 3/2016 | |
| WO | WO-2019094729 A1 | * | 5/2019 | ........... G06N 3/0436 |
| WO | WO 2020/112992 | | 6/2020 | |
| WO | WO-2020180387 A1 | * | 9/2020 | ........... G06F 9/5027 |
| WO | WO-2021067230 A1 | * | 4/2021 | |

OTHER PUBLICATIONS

Andújar et al., "A case study on implementing virtual 5d torus networks using network components of lower dimensionality," 2017 IEEE 3rd International Workshop on High-Performance Interconnection Networks in the Exascale and Big-Data Era (HiPINEB), Feb. 2017, 9-16.

Camara et al., "Twisted torus topologies for enhanced interconnection networks," IEEE Transactions on Parallel and Distributed Systems, Feb. 2010, 21(12):1765-78.

Chen et al., "OSA: An Optical Switching Architecture for Data Center Networks with Unprecedented Flexibility," IEEE/ACM Transactions on Networking (TON) 22, 2 (2014), 498-511.

ClusterDesign.org [online], "Torus interconnect," retrieved on Dec. 14, retrieved from URL <https://clusterdesign.org/torus/t>.

Datasys.cs.iit.edu [online], "Understanding Torus Network Performance through Simulations," retrieved on Dec. 14, retrieved from URL <http://datasys.cs.iit.edu/reports/2014_GCASR14_poster-torus.pdft>.

Farrington et al., "Helios: a hybrid electrical/optical switch architecture for modular data centers," Proceedings of the ACM SIGCOMM 2010 conference, Aug. 2010, 30:339-350.

George et al., "Novo-G#: Large-scale reconfigurable computing with direct and programmable interconnects," 2016 IEEE High Performance Extreme Computing Conference (HPEC), Sep. 2016, 1-7.

Grani et al., "Simultaneous optical path-setup for reconfigurable photonic networks in tiled CMPS," 2014 IEEE Intl Conf on High Performance Computing and Communications, Aug. 2014, 482-485.

Gulzari et al., "A new cross-by-pass-torus architecture based on CBP-mesh and torus interconnection for on-chip communication," PloS one, Dec. 2016. 11(12):e0167590.

(56) References Cited

OTHER PUBLICATIONS

Halperin et al., "Augmenting data center networks with multi-gigabit wireless links," Proceedings of the ACM SIGCOMM 2011 conference, Aug. 2011, 38-49.

Hamedazimi et al., "Firefly: A reconfigurable wireless data center fabric using free-space optics," Proceedings of the 2014 ACM conference on SIGCOMM, Aug. 2014, 319-330.

Jha et al., "Hamiltonian decomposition of the rectangular twisted torus," IEEE Transactions on Parallel and Distributed Systems, Dec. 2011, 23(8):1504-7.

Jha et al., "Dense bipartite circulants and their routing via rectangular twisted torus," Discrete Applied Mathematics, Mar. 2014, 166:141-58.

Lawande et al., "Novo-G#: a multidimensional torus-based reconfigurable cluster for molecular dynamics," Concurrency and Computation: Practice and Experience, Jun. 2016, 28(8):2374-93.

Legtchenko et al., "XFabric: A reconfigurable in-rack network for rack-scale computers," 13th {USENIX} Symposium on Networked Systems Design and Implementation, 2016, 15-29.

m.blog.naver.com [online], "Torus Networks Design," Jul. 2015, retrieved on Dec. 14, 2020, retrieved from URL <https://m.blog.naver.com/PostView.nhn?blogId=framkang&logNo=220414173133&proxyReferer=https:%2F%2Fwww.google.com%2F>, 1 page.

Parhami et al., "Comparing four classes of torus-based parallel architectures: Networkparameters and communication performance," Mathematical and computer modelling, Oct. 2004, 40(7-8):701-20.

Porter et al., "Integrating microsecond circuit switching into the data center," ACM SIGCOMM Computer Communication Review. Aug. 27, 2013:43(4):447-58.

Shafarenko et al., "An adaptive, reconfigurable interconnect for computational clusters," Proceedings First IEEE/ACM International Symposium on Cluster Computing and the Grid, May 2001, 229-236.

Shalf et al., "Analyzing ultra-scale application communication requirements for a reconfigurable hybrid interconnect," SC'05: Proceedings of the 2005 ACM/IEEE Conference on Supercomputing, Nov. 2005, 17-17.

Vallejo et al., "Peripheral twists for torus topologies with arbitrary aspect ratio," Actas XXII Jornadas de Paralelismo, 2011, 421-426.

Wang et al., "c-Through: Part-time optics in data centers," Proceedings of the ACM SIGCOMM 2010 conference, Aug. 2010, 327-338.

Wikipedia.org [online], "Tensor Processing Unit," retrieved on Dec. 14, retrieved from URL <https://en.wikipedia.org/wiki/Tensor_Processing_Unit>.

Wikipedia.org [online], "Torus interconnect," retrieved on Dec. 14, retrieved from URL <https://en.wikipedia.org/wiki/Tensor_Processing_Unit>.

Xu et al., "Petersen-Twisted-Torus Networks for Multiprocessor Systems," J. Convergence Inf. Technol . . . , Nov. 2010, 5(9):200-5.

Extended European Search Report in European Application No. 21199230.0, dated Mar. 28, 2022, 12 pages.

Extended European Search Report in European Application No. 21199227.6, dated Apr. 4, 2022, 11 pages.

Ortin-Obon et al, "Analysis of network-on-chip topologies for cost-efficient chip multiprocessors" Microprocessors and Microsystems, 2016, 13 pages.

Zhang et al, "Defect tolerance in homogeneous manycore processors using core-level redundancy with unified topology" EDAA, 2008, 6 pages.

\* cited by examiner

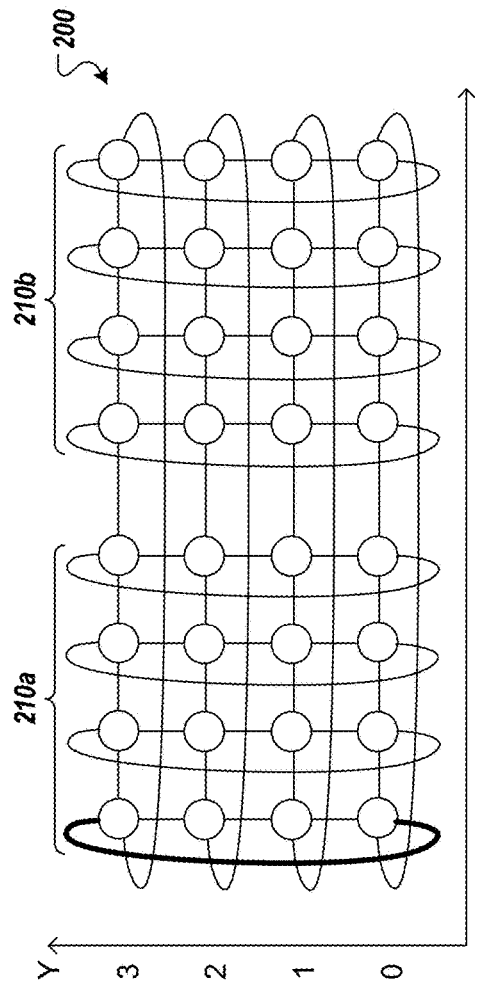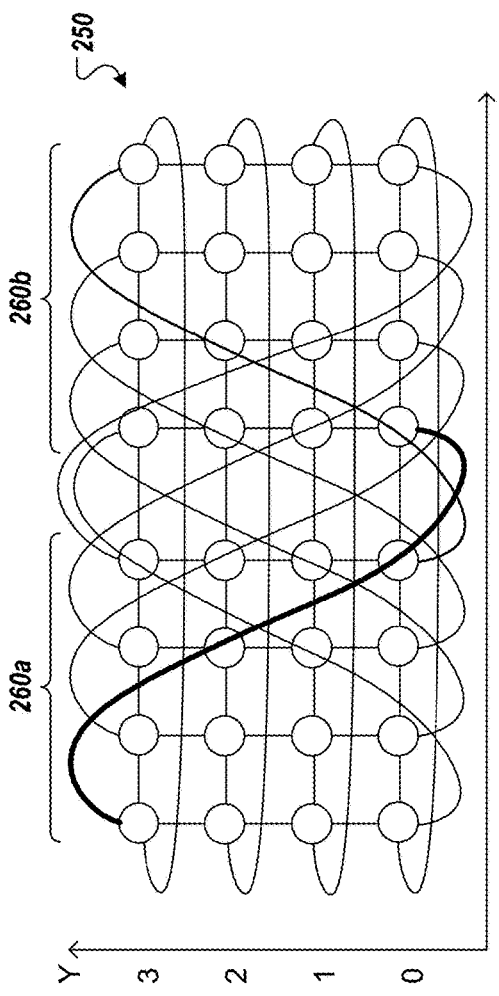

| Dimension | [in] face segment | [out] face segment | Faces Connected |
|---|---|---|---|
| X | (0,0,0) | (4,0,0) | A₋ₓ and B₊ₓ |
| X | (4,0,0) | (0,0,0) | B₋ₓ and A₊ₓ |
| Y | (0,0,0) | (4,0,0) | A₋ᵧ and B₊ᵧ |
| Y | (4,0,0) | (0,0,0) | B₋ᵧ and A₊ᵧ |
| Z | (0,0,0) | (4,0,0) | A₋z and B₊z |
| Z | (4,0,0) | (0,0,0) | B₋z and A₊z |

| Dimension | [in] face segment | [out] face segment | Faces Connected |
|---|---|---|---|
| X | (0,0,0) | (4,0,0) | A₋ₓ and B₊ₓ |
| X | (4,0,0) | (0,0,0) | B₋ₓ and A₊ₓ |
| Y | (0,0,0) | (0,0,0) | A₋ᵧ and A₊ᵧ |
| Y | (4,0,0) | (4,0,0) | B₋ᵧ and B₊ᵧ |
| Z | (0,0,0) | (0,0,0) | A₋z and A₊z |
| Z | (4,0,0) | (4,0,0) | B₋z and B₊z |

8x8x4 Torus Configuration

| Dimension | Faces Connected | [in] face segment | [out] face segment |
|---|---|---|---|
| X | $A_{-X}$ and $B_{+X}$ | (0,0,0) | (4,0,0) |
| X | $B_{-X}$ and $A_{+X}$ | (4,0,0) | (0,0,0) |
| X | $C_{-X}$ and $D_{+X}$ | (0,4,0) | (4,4,0) |
| X | $D_{-X}$ and $C_{+X}$ | (4,4,0) | (0,4,0) |
| Y | $A_{-Y}$ and $B_{+Y}$ | (0,0,0) | (0,4,0) |
| Y | $B_{-Y}$ and $A_{+Y}$ | (0,4,0) | (0,0,0) |
| Y | $C_{-Y}$ and $D_{+Y}$ | (4,0,0) | (4,4,0) |
| Y | $D_{-Y}$ and $C_{+Y}$ | (4,4,0) | (4,0,0) |
| Z | $A_{-Z}$ and $A_{+Z}$ | (0,0,0) | (0,0,0) |
| Z | $B_{-Z}$ and $B_{+Z}$ | (4,0,0) | (4,0,0) |
| Z | $C_{-Z}$ and $B_{+Z}$ | (0,4,0) | (0,4,0) |
| Z | $D_{-Z}$ and $D_{+Z}$ | (4,4,0) | (4,4,0) |

8x8x4 Twisted Torus Configuration

| Dimension | [in] face segment | [out] face segment | Faces Connected |
|---|---|---|---|
| X | (0,0,0) | (4,0,0) | $A_{-x}$ and $B_{+x}$ |
| X | (4,0,0) | (0,0,0) | $B_{-x}$ and $A_{+x}$ |
| X | (0,4,0) | (4,4,0) | $C_{-x}$ and $D_{+x}$ |
| X | (4,4,0) | (0,4,0) | $D_{-x}$ and $C_{+x}$ |
| Y | (0,0,0) | (0,4,0) | $A_{-Y}$ and $B_{+Y}$ |
| Y | (0,4,0) | (0,0,0) | $B_{-Y}$ and $A_{+Y}$ |
| Y | (4,0,0) | (4,4,0) | $C_{-Y}$ and $D_{+Y}$ |
| Y | (4,4,0) | (4,0,0) | $D_{-Y}$ and $C_{+Y}$ |
| Z | (0,0,0) | (4,4,0) | $A_{-z}$ and $D_{+z}$ |
| Z | (4,4,0) | (0,0,0) | $B_{-z}$ and $C_{+z}$ |
| Z | (4,0,0) | (0,4,0) | $C_{-z}$ and $B_{+z}$ |
| Z | (0,4,0) | (4,0,0) | $D_{-z}$ and $A_{+z}$ |

| Network Dimensions (X x Y x Z), where "k" is an integer | Twists |
|---|---|
| 2k x k | Y: X+k |
| 2k x k x k | Y: X+k<br>Z: X+k |
| 2k x 2k x k | Z: X+k, Y+k |

FIG. 5

| Configuration | Twisting | Network diameter (hops) | | Average hops, uniform random | | Max. avg. channel load, uniform random(arb. unit) | | |
|---|---|---|---|---|---|---|---|---|
| | | Torus | Twisted | Torus | Twisted | Torus | Twisted (rand) | Twisted (determ) |
| 4 x 4 x 4 | none | 6 | 6 | 3 | 3 | 0.5 | 0.5 | 0.5 |
| 8 x 4 x 4 | Y: X+4, Z: X+4 | 8 | 6 | 4 | 3.44 | 1.0 | 0.573 | 0.578 |
| 8 x 8 x 4 | Z: X+4, Y+4 | 10 | 6 | 5 | 4.31 | 1.0 | 0.719 | 0.719 |
| 8 x 8 x 8 | none | 12 | 12 | 6 | 6 | 1.0 | 1.0 | 1.0 |
| 16 x 8 x 8 | Y: X+8, Z: X+8 | 16 | 12 | 8 | 6.97 | 2.0 | 1.16 | 1.16 |
| 16 x 16 x 8 | Z: X+8, Y+8 | 20 | 12 | 10 | 8.72 | 2.0 | 1.45 | 1.45 |
| 16 x 16 x 16 | none | 24 | 24 | 12 | 12 | 2.0 | 2.0 | 2.0 |

FIG. 6

| Configuration | Speedup in uniform random bandwidth over torus |
|---|---|
| 4 x 4 x 4 | 1.0 |
| 8 x 4 x 4 | 1.73 |
| 8 x 8 x 4 | 1.39 |
| 8 x 8 x 8 | 1.0 |
| 16 x 8 x 8 | 1.72 |
| 16 x 16 x 8 | 1.38 |
| 16 x 16 x 16 | 1.0 |

FIG. 7

| Network | Minimal route constraints | Diameter | Average hops |
|---|---|---|---|
| k x k | $|x| \leq k/2$<br>$|y| \leq k/2$ | k | k/2 |
| 2k x k | $|x| + |y| \leq k$ | k | $2k/3 - 1/(6k)$ |
| k x k x k | $|x| \leq k/2$<br>$|y| \leq k/2$<br>$|z| \leq k/2$ | 3k/2 | 3k/4 |
| 2k x k x k | $|x| + |y| \leq k$<br>$|x| + |z| \leq k$<br>$|y| + |z| \leq k$ | 3k/2 | $7k/8 - 1/(4k)$ |
| 2k x 2k x k | $|x| \leq k$<br>$|y| \leq k$<br>$|z| \leq k$<br>$|x| + |y| + |z| \leq 3k/2$ | 3k/2 | $35k/32 - 1/(4k)$ |

FIG. 8

Example table mapping node sizes to network configurations
(where network dimensions are limited to multiples of 4)

900

| Minimum Number of nodes needed | Number of nodes used | Network Topology | Interconnection Type |
|---|---|---|---|
| 1-16 | 16 | 4x4 | 2D Torus |
| 17-32 | 32 | 8x4 | 2D Twisted Torus |
| 33-48 | 48 | 12x4 | 2D Twisted Torus |
| 49-64 | 64 | 4x4x4 | 3D Torus |
| 65-128 | 128 | 8x4x4 | 3D Twisted Torus |
| 129-192 | 192 | 12x4x4 | 3D Twisted Torus |
| 193-256 | 256 | 8x8x4 | 3D Twisted Torus |
| 257-384 | 384 | 12x8x4 | 3D Twisted Torus |
| 385-512 | 512 | 8x8x8 | 3D Torus |
| ... | ... | ... | ... |

FIG. 9

Example network topologies and interconnection types

1000

| Number of nodes used | Network Topology | Interconnect Type |
|---|---|---|
| 1 | 1x1 | n/a |
| 2 | 2x1 | 2D Twisted Torus |
| 3 | 3x1 | 2D Twisted Torus |
| 4 | 2x2 | 2D Torus |
| 8 | 2x2x2 | 3D Torus |
| 8 | 4x2 | 2D Twisted Torus |
| 9 | 3x3 | 2D Torus |
| 12 | 6x2 | 2D Twisted Torus |
| 16 | 4x2x2 | 3D Twisted Torus |
| 16 | 4x4 | 2D Torus |
| 18 | 6x3 | 2D Twisted Torus |
| 24 | 6x2x2 | 3D Twisted Torus |
| 25 | 5x5 | 2D Torus |
| 27 | 3x3x3 | 3D Torus |
| 27 | 9x3 | 2D Twisted Torus |
| 32 | 4x4x2 | 3D Twisted Torus |
| 32 | 8x2x2 | 3D Twisted Torus |
| 32 | 8x4 | 2D Twisted Torus |
| 36 | 6x6 | 2D Torus |
| 48 | 12x3 | 2D Twisted Torus |
| 54 | 6x3x3 | 3D Twisted Torus |
| 64 | 4x4x4 | 3D Torus |
| 64 | 8x4x2 | 3D Twisted Torus |
| 64 | 12x4 | 2D Twisted Torus |
| 81 | 9x3x3 | 3D Twisted Torus |
| 96 | 8x6x2 | 3D Twisted Torus |
| 108 | 6x6x3 | 3D Twisted Torus |
| 125 | 5x5x5 | 3D Torus |
| 128 | 8x4x4 | 3D Twisted Torus |
| 192 | 8x6x4 | 3D Twisted Torus |
| 216 | 6x6x6 | 3D Torus |
| ... | ... | ... |

FIG. 10

CONNECTING PROCESSORS USING TWISTED TORUS CONFIGURATIONS

BACKGROUND

The present description generally relates to processor topologies using twisted torus configurations

BACKGROUND

Machine learning often requires large amounts of computation and communication bandwidth. To provide the needed processing capability, devices such as artificial intelligence (AI) accelerators can be used. In some cases, networks of many interconnected AI accelerators can be used to provide the desired processing capability. More generally, clusters of processors can have different sizes and configurations, resulting in different properties and thus varying levels of suitability for different computational tasks.

SUMMARY

In some implementations, a system provides a large cluster of processing nodes that are connected by a reconfigurable interconnect fabric. The reconfigurable interconnect network can include switching devices, e.g., multiplexers or other elements, to selectively enable various combinations of direct, physical-layer connections between processing nodes. The processing nodes can be artificial intelligence (AI) accelerator devices or machine learning (ML) accelerator devices, for example, application-specific integrated circuits (ASICs) such as a Tensor Processing Unit (TPU). As a result, the system can provide a large cluster of accelerators that are configurable in many different ways to achieve the performance characteristics needed for different tasks.

The system can be implemented as a shared system that allows different users to concurrently and remotely access different portions of a large cluster of computing nodes. For example, a host system can dynamically allocate groups of processing nodes from a cluster of processing nodes that may include, for example, hundreds or thousands of different processors. The groups of nodes can be different, distinct proper subsets of the processing nodes in the system. Different users and tasks have different requirements, and so different numbers of processing nodes can be allocated for different situations. For example, different users may respectively request different numbers of nodes, typically as powers of two, e.g., 2, 4, 8, 16, 32, 64, 128, etc. In addition to allowing different numbers of nodes to be allocated, the system can organize the nodes in different topologies using the reconfigurable interconnect fabric, e.g., with different arrangements of data connections between the nodes. The different networks (e.g., groups of nodes, potentially with different node interconnection scheme), are then made available independently to different users. In effect, a single large physical cluster of processing nodes can be presented to multiple different users as virtual clusters configured according to the needs of the different users. Each group of nodes forming a virtual cluster operates separately from the groups of nodes for other users, allowing each to be isolated from the rest of the network.

One of the benefits of the system is the ability to use different interconnection schemes for different node topologies, to improve the performance of computing tasks performed with different sizes and topologies of networks. For networks that have a cubical arrangement of nodes, a torus configuration provides a symmetric network with high performance. For other network configurations that are not cubical, however, the a twisted torus interconnection scheme can be used. This can provide symmetry to network topologies that would not have been symmetrical with a standard torus. For non-cubical dimensions of nodes, the twisted torus interconnect can offer higher bisection bandwidth, better load balance characteristics, and lower network diameter. For example, interconnecting a group of nodes in a 8×4×4 configuration as a 3D twisted torus offers a ~1.73× increase in effective bandwidth for all-to-all (e.g., uniform random) traffic compared to a traditional 3D torus interconnect.

In some implementations, when a user launches a machine learning training job through a request to the system, the host loads the training data from the storage and sets up the environment. This can include selecting an appropriate number of nodes, selecting a topology for the nodes, and selecting an interconnect scheme for the nodes (e.g., whether to add a twist to the torus, and if so, to what extent). The system then allocates the network with the selected parameters and makes it available for performing the user's processing task. After the network is established, the ASIC accelerator chips in the network perform the needed tasks, such as training machine learning models (e.g., neural networks) and communicate with each other through fast, direct connections such as Inter-Core Interconnect (ICI) links. Tasks such as machine learning model training may require a duration on the order from seconds up to days, depending on the machine learning model size, training data size, and the number of ASIC accelerator chips. During that period, the amount of inter-host communication is much less than the ASIC-ASIC communications between processing nodes of an allocated network.

In some implementations, a method performed by one or more computers includes: providing a cluster of processing nodes coupled using a reconfigurable interconnect fabric; determining a number of processing nodes to allocate as a network within the cluster and a topology for the network; selecting an interconnection scheme for the network, wherein the interconnection scheme is selected from a group that includes at least a torus interconnection scheme and a twisted torus interconnection scheme; allocating the determined number of processing nodes of the cluster in the determined topology; setting the reconfigurable interconnect fabric to provide the selected interconnection scheme for the processing nodes in the network; and providing access to the network for performing a computing task.

In some implementations, selecting the interconnection scheme comprises selecting between the torus interconnection scheme and the twisted torus interconnection scheme based on the determined number of processing nodes.

In some implementations, selecting the interconnection scheme comprises selecting the torus interconnection scheme based on determining that, for a network of a number of dimensions that the reconfigurable interconnect fabric supports, the number of processing nodes allows the network to have equal size in each of the dimensions. For example, if the reconfigurable interconnect fabric enables torus networks of two dimensions or three dimensions, the system can determine if the number is a perfect square or a perfect cube.

In some implementations, the selected topology has a first size in a first dimension and a second size in a second dimension. Selecting the interconnection scheme comprises selecting the twisted torus interconnection scheme based on determining that the first size is a multiple of the second size.

In some implementations, the selected topology for the network comprises an arrangement of nodes that extends along multiple dimensions and includes multiple nodes along each of the multiple dimensions, wherein the selected topology has different amounts of nodes along at least two of the multiple dimensions. Selecting the interconnection scheme comprises selecting the twisted torus interconnection scheme such that the network is symmetric.

In some implementations, the twisted torus interconnection scheme includes wraparound connections made using switching elements of the reconfigurable interconnect fabric. Wraparound connections connect nodes or edges of the network that face opposite directions along a same dimension, wherein the wraparound connections for a first dimension in which the network is longest do not include any offsets in other dimensions, and wherein the wraparound connections for a second dimension in which the network is shorter than the first dimension has an offset in the first dimension.

In some implementations, the wraparound connections for the second dimension are each determined by connecting a starting node with an ending node that has: (i) a position in the second dimension that is the same as the starting node, and (ii) a position in the first dimension that is equal to a result of a modulo operation involving (a) a sum of a position of the starting node in the first dimension and a predetermined twist increment determined based on the node topology and (b) a length of the longest dimension.

In some implementations, selecting the interconnection scheme comprises selecting the twisted torus interconnection scheme. The method includes selecting an amount of twist and dimensions in which to apply an offset for the twist based on lengths of the selected topology.

In some implementations, the selected topology is a two-dimensional topology.

In some implementations, the selected topology is a three-dimensional topology.

In some implementations, the cluster of processing nodes comprises multiple segments having a predetermined size and arrangement of multiple processing nodes, the segments having mesh connections between the nodes in each segment. The reconfigurable interconnect fabric comprises switching elements to permit dynamic, programmable reconfiguration of connections for external-facing data ports of processing nodes in each segment.

In some implementations, the segments are each a 4×4×4 group of processing nodes.

In some implementations, the processing nodes are each separate application specific integrated circuits (ASICs).

In some implementations, the reconfigurable interconnect fabric comprises switches for data-carrying optical signals.

In some implementations, the computing task comprises training a machine learning model.

In some implementations, the method includes storing multiple configuration profiles specifying different configurations of the reconfigurable interconnect fabric to connect subsets of the processing nodes in the cluster; and selecting a configuration profile from among the multiple configuration profiles. Switching elements of the reconfigurable interconnect fabric are set according to the selected configuration profile.

In some implementations, the method includes initializing routing tables for processing nodes in the network based on stored routing information corresponding to the selected configuration profile.

In some implementations, the method includes allocating distinct networks of processing nodes for different users from among the processing nodes in the cluster, the distinct networks having different interconnection schemes.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2A is a diagram showing an example of a torus configuration of interconnections for an 8×4×1 topology.

FIG. 2B is a diagram showing an example of a twisted torus configuration of interconnections for an 8×4×1 topology.

FIG. 5 is a table showing example twist parameters for sizes of processing node networks.

FIG. 6 is a table showing different node and interconnect configurations and related characteristics.

FIG. 7 is a table showing different node configurations and uniform random bandwidth measures of twisted torus interconnections compared to standard torus interconnections.

FIG. 8 is a table showing various node network configurations and related properties.

FIGS. 9 and 10 are tables showing examples of node network configurations.

Like reference numbers and designations in the various drawings indicate like elements.

DETAILED DESCRIPTION

Figure 1:
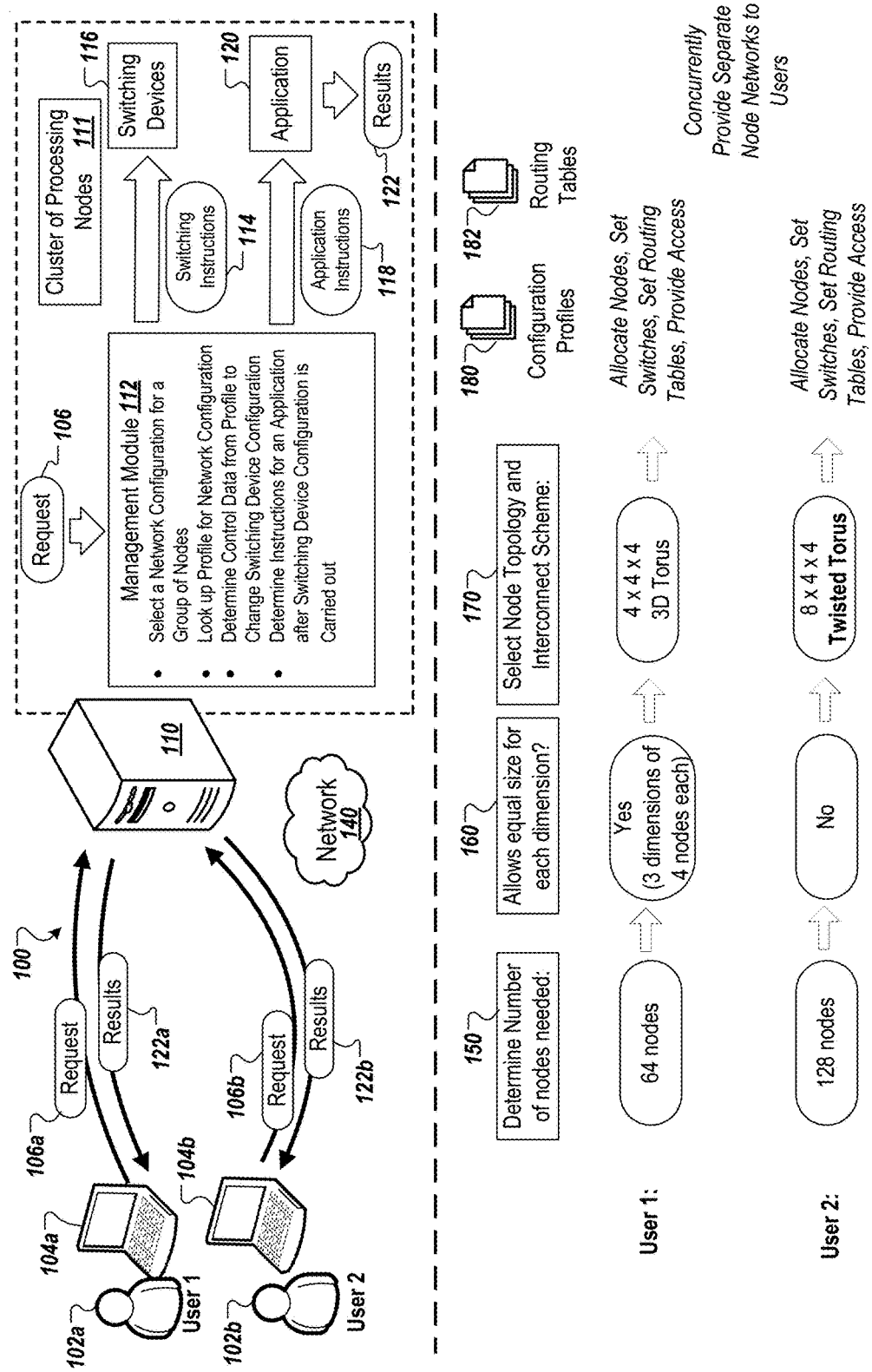
FIG. 1 is a diagram showing an example of a system for connecting processing nodes in different configurations, including twisted torus configurations.

FIG. 1 is a diagram showing an example of a system 100 for connecting processing nodes in different configurations, including twisted torus configurations. The system 100 includes a server system 110 that provides access to a cluster of processing nodes 111. The system also includes a client device 104 that a user can use to request processing tasks to be performed using the cluster of processing nodes 111. The server 110 and the client device 104 can communicate over a network 140. The client device 104 may be used by one or more users, such as a user 102a, 102b. Many different client devices can be used to concurrently communicate with the server system 110 and perform computing tasks using separate networks that the system 110 allocates from among the nodes in the cluster 111.

The cluster 111 of processing nodes has a reconfigurable interconnect fabric that enables different configurations of processing nodes. The server system 110 includes a management module 112 that can analyze the computing needs for a user or task, select appropriate parameters (e.g., number of nodes, topology of nodes, interconnect scheme, etc.), and then set switches or other reconfigurable elements of the interconnect fabric (e.g., switching devices 116) to allocate and initialize a node network with the selected parameters. The system can support various node topologies and interconnect schemes as discussed further below. Typically, the management module 112 allocates small groups of nodes within the cluster 111, often using a small fraction of the total set of processing nodes in the cluster 111 and leaving the remaining processing nodes to be allocated in different subsets which may have different topologies for different jobs run by different users.

More generally, the management module 112 performs resource allocation to allocate different subsets of the processing nodes in the cluster 111 for different tasks (e.g., for the tasks of different users, applications, accounts, sessions, etc.). From a large cluster 111 of dozens, hundreds, thousands, or tens of thousands of processing nodes, the management module 112 allocates different subsets of processing nodes to operate separately, e.g., independent of the rest of the cluster 111 and with the subsets isolated from each other. For example, the system can dynamically assign an isolated subgraph or sub-network of processing nodes within the overall cluster. This allows the cluster of processing nodes 111 to be shared concurrently for many different users or tasks, enabling the subsets or subgroups of nodes to run their respective tasks independently and isolated from each other. The arrangement facilitates use as a cloud computing platform, such as for software as a service (Saas), platform as a service (PaaS), machine learning as a service (MLasS), and other use cases.

In general, the disclosure relates to reconfiguring channels of communication or ports in a high-speed communication network, e.g., a network of machine learning accelerators that includes multiple application specific integrated circuits (ASICs). Deep learning training often necessitates distributed, parallel processing. The distribution can either partition the large amounts of training data into different replications or replicas (e.g. data parallelism), or partition a very large model into smaller modules (e.g., model parallelism). The partitioned training data and model parameters are put onto different processing units to compute concurrently.

Distributed training happens in a synchronous, iterative, and incremental loop. Under data parallelism, each processing unit ingests a mini-batch of data at each step, computes the local gradients, and then exchanges all local gradients throughout the network of compute units in an all-reduce manner to compute a final, globally consistent gradient, with which model weights are updated at the end of a step.

Under model parallelism, each processing unit takes model activation input from its local training data, or from the output of another processing unit that operates on hidden layers before itself. The processing unit then computes the activation output, which can either be a final model output, or serve as the activation input of another processing unit. The gradient is computed on the processing unit that includes the final layer, and gets sent back to the previous layers to update the partitioned submodels. This process can be pipelined to operate on successive mini-batches. Under this approach, intermediate activation output is sent around the network, as well as the gradients at the model partitioning boundaries.

In practice, data and model parallelism can be combined to achieve the highest performance. For example models with hundreds of billions of weight parameters, a huge amount of compute resources and communications are needed to converge the model to the level of accuracy required.

To speed up the training process, ASICs such as the custom-built accelerator chip the Tensor Processing Unit (TPU) are designed to serve as processing nodes in order to speed up deep learning computation tasks. In some implementations, other accelerator chip types are used as processing nodes (e.g., FPGAs, GPGPUs, or CPUs). Meanwhile, a co-designed inter-accelerator high-speed communication network is also built to speed up the inter-processing unit communication. Altogether, the training system can provide exaFLOP-level compute performance, equivalent to a state-of-the-art supercomputer.

The TPU accelerator's custom-built network is designed for simplicity in order to reduce the network processing overhead. With the fundamental features of an interconnected network complete, such as addressing, error detection and correction, routing and flow control, the bulk of network processing is carried over on the accelerator chip hardware to speed up processing.

The solutions disclosed herein apply to the synchronous data-parallel and model-parallel training pattern discussed above, and also apply to asynchronous, distributed training in an accelerator network in general.

The components of the system 100 can be interconnected by any form or medium of digital data communication (e.g., a communication network 140 such as the Internet).

The cluster of nodes 111 can include many different processing chips (e.g., ASICs) that provide the processing nodes. The system 110 can be a shared system that allows multiple users to use the system concurrently. The system 110 can allocate subsets of the processor and allocate groups of the processing nodes for different users.

The different processing nodes can be interconnected by wires and/or optical links to be able to transfer data between them. The interconnections can be coupled through switches that allow dynamic changes to the interconnections between processing nodes. For example, the system 110 can allocate a group of processing nodes for a user and set the switches to isolate that group from the rest of the cluster 111. The system can present a smaller group of nodes to the user, e.g., a subset of 64 or 128 interconnected processing nodes out of thousands in the overall cluster 111 processing data separately from the rest of the cluster.

The nodes in the cluster 111 can be conceptually organized into different dimensions with nodes being indexed with coordinates, e.g., X, Y, and Z coordinates. A subset can be allocated with a cubical topology, e.g., with a size of 4 for each of the three dimensions (e.g., 4×4×4) for a cube topology having a total of 64 nodes. Cubical configurations can interconnected in a 3D torus configuration, in which every node is connected to its neighboring nodes one unit distance away. Each node would be connected to six other nodes, one node in each direction along each of the X, Y, and Z directions (e.g., +/−1 unit in each of X, Y, and Z). At the edges or surfaces of the cube shape, where the nodes do not have an immediate neighbor in a certain direction, the 3D torus provides a connection that wraps around to the opposite side. For example, for a 4×4×4 cube arrangement, the node at coordinate (0, 0, 0) would have a connection that wraps around to connect with the node at (3, 0, 0). These wraparound connections provide symmetry for the paths and provide high efficiency.

The system can provide groups of processing nodes in cubical topologies (e.g., 4×4×4, 8×8×8) that use a 3D-torus interconnections among processing nodes.

The system can also provide groups of processing nodes in non-cubical configurations (e.g. 8×4×4, 8×8×4) interconnected as twisted tori topologies. For non-cubical dimensions of nodes, the twisted torus interconnect can offer higher bisection bandwidth, better load balance characteristics, and lower network diameter. For example, interconnecting a group of nodes in a 8×4×4 configuration as a 3D twisted torus offers a ~1.73× increase in effective bandwidth for all-to-all (e.g., uniform random) traffic compared to a traditional 3D torus interconnect. This technique can be implemented with a cluster that has only partial reconfigurability in the interconnect fabric, such as reconfigurability at only certain edges or interfaces.

In some implementations, the cluster of processing nodes 111 is formed of small units or "segments" that each include multiple processing nodes and connections among the nodes in the segment. The use of separate segments can facilitate partitioning and failure isolation. Typically, the segments each generally have the dimensions and topology. As an example, the segments can each be arranged in a 4×4×4 topology, e.g., with 64 nodes in a cubical arrangement. Other segment types may be used, such as 2×2×2, 2×2×1, 4×4×2, and so on. Within an individual segment, the nodes may be permanently or non-reconfiguably connected, e.g., in a manner that the interface ports are not reassignable outside the segment or at all.

Nodes within the segment are 3D-mesh connected. In other words, if the processing nodes are considered to occur along three axes, X, Y, and Z, each node can connect with its six neighbors (e.g., the nodes at positions before and after in each of the three dimensions). At the sides of the segment, such as the faces of the cube formed by a 4×4×4 segment topology, there are data ports that are available to connect to the exteriors of other segments. The connections at these external faces of the segment topology can be routed to switches, such as optical circuit switches. The switches can be configured to selectively connect the segments together into larger topologies. For example, the switches can be used to connect adjacent sides and extend the 3D mesh between to any appropriate combination of segments working together. For example, the system can connect two 4×4×4 segments into a 8×4×4 topology, connect four 4×4×4 into an 8×8×4 topology, and so on. In general, groups of segments can be connected to achieve any topology of "4s×4t×4u" 3D torus for integer values of s, t, and u.

The processing nodes may be allocated in and used in different nodal configurations (e.g., topologies) as sub-networks within the cluster 111. Different configurations may include different numbers of processing nodes and different arrangements of the nodes. In general, node configurations often include arrangements of nodes in two or three dimensions, with mesh connections between the adjacent nodes. The mesh connections refer to bidirectional connections between each node with its neighbors along the grid dimensions, X, Y, Z. A two-dimensional configuration may have nodes at integer positions along an X-Y grid, e.g., a 4×4 configuration representing 16 nodes arranged in a square, a 8×4 configuration representing 32 nodes in a rectangle with 8 nodes along the X dimension and 4 nodes along the Y dimension, and so on. Three dimensional configurations have positions assigned in three dimensions, X, Y, and Z, e.g., a 4×4×4 configuration having 64 nodes and a length of four along each dimension, a 8×4×4 configuration having 128 nodes with a length of 8 along the X dimension and lengths of four nodes along the Y and Z dimensions, and so on.

Different configurations (e.g., sizes and arrangements of sub-networks of processing nodes) can be selected by the server 110 to meet the needs of different users and tasks. The system 110 can also choose and apply different interconnect arrangements for different node networks, for example, torus interconnect arrangements or twisted torus interconnect arrangements.

The management module 112 may select a particular network configuration for the nodes in the cluster 111 and reconfigure the connections among a portion of the cluster 111 to provide the selected network configuration. The server 110 may select the number of nodes in a sub-network and the particular network configuration for the nodes based on one or more factors, such as the specific task or job that the nodes will be used to perform, the type of task or job that the nodes will be used to perform, the user requesting a task or job, a group of users that a user requesting a task or job belongs to, an application that will be used to perform a task or job with the nodes, or a type of application that will be used to perform a task or job with the nodes. Although examples discussed below may describe selecting a network configuration based on a particular task/job or a particular type of task/job, other factors may be used in addition to or in place of task/job factor(s) for selecting a particular network configuration for a group of nodes.

Each of the nodes may have multiple data ports (e.g., ICI ports). The nodes may be part of chipset, such as an artificial intelligence accelerator application-specific integrated circuit (ASIC). One example of an ASIC would be a tensor processing unit (TPU). Each node may represent a chip on one or more chipsets. For example, each chipset may include four chips that each serve as a node. Each chipset may further include one or more switching devices for each of the nodes, such as one or more multiplexers (e.g., ICI multiplexers) that are used to reconfigure the network configuration.

The client device 104 may be, for example, a mobile computing device such as a smart phone, a mobile phone, a table computer, a smart watch, a laptop computer, a PDA, etc. The client device 104 may be a desktop computer, a server, or part of a server. The client device 104 may include a storage device. The client device 104 may include memory, such as RAM (e.g., DRAM, SRAM, etc.).

The network 140 may be a local area network ("LAN"), a wide area network ("WAN"), a peer-to-peer network (having ad-hoc or static members), a grid computing infrastructure, or the Internet.

As illustrated in FIG. 1, users 102a, 102b each separately send a request 106a, 106b to the server 110 over the network 140. The requests 106a, 106b may correspond to or specify a task or type of task to be performed by the cluster 111 of processing nodes. For example, the task may training of a machine learning model, such as a neural network. For example, the requests 106a, 106b may be sent, in response to input from the respective users 102a, 102b, to initiate processing of two different machine learning tasks. The requests 106a, 106b may include additional information, such as an indication of the client device 104a, 104b, user 102*a*, 102*b*, account or organization, or other information related to the request 106*a*, 106*b*.

The server 110 provides each request 106*a*, 106*b* to the management module 112, which selects a number of nodes to use for each request, a configuration of the nodes, and an interconnection scheme for the nodes. The management module 112 then allocates and initializes a network for each user and then provides each user 102*a*, 102*b* access to his or her respective network within the cluster 111. An example of the process of selecting a number of nodes and other configuration parameters is shown for the two different users.

The management module 112 can determine a number of nodes to be used for each user (150). For example, users may specify a number of nodes to use, and that can be transmitted in a request 106*a*, 106*b*. As another example, the nature of the task, size of a data set to be used, time constraints or targets for completion of the task, cost or resource limits, and other parameters may be used to select an appropriate number of nodes to be used. In the example, the system determines that 64 processing nodes should be used for user 1's task and 128 processing nodes should be used for user 2's task.

The management module 112 determines if the number of nodes allows for a topology with equal values for each of multiple dimensions (160). For example, a number of nodes that can be expressed as n^2 for an integer n allows a square topology in 2 dimensions (e.g., the number of nodes is a perfect square such as 4=2^2, 9=3^2, 16=4^2, etc.), a number of nodes that can be expressed as n^3 for an integer n allows a cubical topology in 3 dimensions (e.g., a number of nodes is a perfect cube such as 8=2^3, 27=3^3, 64=4^3, etc.), a number of nodes that can be expressed as n^4 for an integer n allows a topology with an equal size in each of 4 dimensions (e.g., a number of nodes such as 16=2^4, 81=3^4, 256=4^4, etc.), etc.

The system can check for each number of dimensions that the cluster has connectivity to support. For example, one network may have sufficient switching capability, data ports, and connections to allow one-dimensional torus arrangements (e.g., a single node or line of nodes 2×1, 3×1, etc.), 2D torus arrangements, and 3D torus arrangements. Another cluster with a different reconfigurable fabric may provide more switches, connections, and data ports for nodes to additionally support 4D torus interconnections and/or 5D torus interconnections.

This determination is one of the factors that can affect which node topology and interconnect scheme is used. In the case of user 1, the number of nodes selected, e.g., 64, is a perfect cube, e.g., 4^3. For user 2, the number of nodes selected, e.g., 128, is not a perfect cube and so does not support a cubical topology. In the example, the cluster 111 and associated interconnect fabric supports networks of 1, 2, and 3 dimensions. Although a network 128 nodes could be provided by a 7-dimensional network of size 2, the cluster 111 and reconfigurable interconnect in this example do not support 7-dimensional networks.

The management module 112 selects a node topology and interconnect scheme for each network to be used (170). When the set of available nodes is a perfect cube, the system can arrange the nodes in a cubical configuration, e.g., 4×4×4, 8×8×8, 12×12×12. The nodes within the cube are connected in a mesh interconnection, with bidirectional data links between each adjacent node. For the connections at the outer faces of the cube, wraparound connections can be made to form a torus configuration. That is what the management module 112 selects for the network for user 1.

For networks of nodes that do not have an amount of nodes that is a perfect cube, a cubical topology of nodes is not possible. Other non-cubical topologies may provide better performance using a twisted torus interconnection than a standard torus interconnection. As discussed below, the system can use twisted torus configurations to provide symmetrical networks for non-cubical node topologies. For user 2, the management module 112 selects an 8×4×4 topology of nodes and a twisted torus, where wraparound connections in the Y and Z dimensions include offsets in the X dimension, as discussed further below with respect to FIGS. 2A-8. Twisted torus interconnections can provide more balanced, more symmetrical networks and higher performance than standard torus interconnections for non-cubical node topologies.

The server system 110 can store various configuration profiles 180 that indicate different node topologies and interconnect schemes, as well as switch settings (e.g., settings for switching elements) to achieve the different configurations. The selection of node topologies and interconnects can include selecting for each user a configuration profile from among profiles for multiple possible configuration, e.g., where the configurations may have different numbers of nodes, different node topologies, and different interconnect schemes. In some cases, the management module 112 may adjust the number of nodes to be used or consider other factors in selecting the topology and interconnect scheme. For example, the constraints for a user may specify a range of amounts of nodes (e.g., between 40 and 80 nodes, or at least 50 nodes, etc.), and the management module 112 can select a particular number of nodes that allows for a favorable topology. For example, if at least 50 nodes are requested by a user, the system may increase to 64 to be able to provide a cubical topology. In general, the system may support networks of certain discrete amounts of nodes and then select the next closest number that corresponds to one of the available configurations described by one of the configuration profiles 180.

In cases where the user does not specify a number of nodes (e.g., a specific number or at least a minimum desired number of processing nodes to use), the system may obtain information about a processing task and use that information to determine a number of nodes that should be used. In some cases, this may be done by profiling or classifying the task or data set to be used and determining constraints for the task. For example, the computer system 110 can estimate aspects of the processing task such as a type or category of the task (e.g., training a neural network, video rendering, etc.), an application or function to be used, a number of threads, software functions to be performed and expected or typical amounts and types of operations performed by those functions (e.g., amounts and integer, floating point, vector multiplication, an algorithm to be used (e.g., a particular machine learning model training algorithm), parameters for the algorithm (e.g., a learning rate, etc.), characteristics of a machine learning model to be trained (e.g., size or structure of the model, such as a number of trainable parameters in a neural network model, a number of neural network layers in the model, types of neural network layers in the model, etc.), an amount or type of training data to be used (e.g., number of examples, storage size of the data, etc.), a number of training iterations or epochs expected, and so on. The system 110 can also determine constraints for the task, such as a time needed for completion (e.g., a target completion time or deadline), an accuracy of output desired for the model after training, a minimum or maximum level of resources to be allocated to the task, and so on. From the data characterizing the nature of the task and the constraints for the task, the system can determine a level of resources and type of resources appropriate for the task, e.g., that are expected to complete the task and meet the constraints. This can be expressed in a number of ways, such as an amount of operations or rate of mathematical operations, a bandwidth or latency level needed, a classification of the complexity or computational demands of the task (e.g., class 1, class 2, or class 3, representing different levels of processing complexity), and so on. The number of nodes to allocate for the task, and/or a preferred interconnect topology, can be determined directly for the task or based on the other measures of resources needed for the task.

Whether the level of processing resources needed is specified by a user or determined by the system, the server system 110 can store and use a table or other data that maps processing requirements (e.g., whether expressed in individual node amounts, a class or range for a node amount, or another measure of processing capability) to corresponding topologies. For example, the table can indicate the different configurations provided by the configuration profiles 180 and map them to different numbers of nodes. Once a number of processing nodes is determined, or at least a class or range of processing capability is determined for a task, the system 110 can look up in the table which configuration profile 180, e.g., which topology and interconnection scheme, best suits the task.

FIG. 9 shows an example table 900 that maps numbers of nodes to different network topologies. The example limits network dimensions to multiples of four and allows 2D and 3D topologies. Each of the topologies provides a symmetric network. For example if a task is determined to need approximately 8 nodes, the first entry in the table directs the system 110 to use a 4×4 topology with a 2D torus interconnection. The networks that use standard torus configurations are indicated in bold. The configurations with twisted torus connections provide additional options for symmetric networks for numbers of nodes that are in between the numbers that permit square or cubical networks where a standard torus is symmetric. For example, for a network size of 32 nodes, a symmetric network can be provided with an 8×4 twisted torus configuration, providing significantly better performance than an 8×4 standard torus and providing an option for a symmetric network much smaller than the 64 nodes of an 8×8 topology or a 4×4×4 topology.

FIG. 10 shows an example table 1000 that gives various examples of symmetric networks with different topologies and node configurations. This example does not constrain the network size to have dimensions that are multiples of four. The entries in FIG. 10 represent different options for networks that the system 110, and but the system 110 is not required to directly select the specific configuration listed for a specific number of nodes. For example, there are two different entries that can provide a symmetric network with 8 nodes. The system 110 could further select between these options based on the different performance characteristics and network properties (e.g., network diameter, average hops from one node to another, etc.). Similarly, if 25 nodes are indicated to be used for a task, the system 110 may determine that moving up to 27 nodes to allow the 3×3×3 3D torus configuration would provide significant performance benefits over the 5×5 2D torus configuration.

FIG. 10, like FIG. 9 and the other tables herein, is not intended to be comprehensive. Rather, it shows that the ability of the system 110 to selectively configure networks of different sizes and in torus or twisted torus interconnect schemes provide significant versatility to the system 110. In particular, the system 110 has the ability to choose from among many different topologies and interconnection types to provide symmetric networks for many different sizes (e.g., many different numbers of nodes). This allows performance to scale more evenly for networks of different sizes, using twisted torus interconnections to decrease the performance penalty of using networks of sizes between perfect squares for 2D networks and between perfect cubes for 3D networks.

In some cases, there are multiple symmetric network configurations that can be used for the same number of nodes. Typically, topologies with higher dimensions (e.g., 3D vs 2D) and more similar sizes for the dimensions (e.g., 4×4 rather than 8×2) are preferred due to better latency and bandwidth performance. Although not illustrated in FIGS. 9 and 10, entries in tables of configuration types and the configuration profiles 180 themselves can include or be labeled with performance characteristics, so the system can select the configuration that is most appropriate for the performance needs of the task. For example, for example, the system 110 can select the smallest network (e.g., network with the fewest nodes) that meets a minimum performance level, or select a configuration that has the highest performance level given a constraint on a maximum number of nodes.

As another example, the server system 110 can have rules that assess whether different conditions a processing task are met, with different combinations of conditions being met leading to different topology selections. For example, the system 110 can use a decision tree to use properties of a task and/or properties Although the disclosure emphasizes the use of symmetric networks, the server system 110 also has the option of using standard torus interconnection schemes, even for non-perfect-square and non-perfect-cube numbers of nodes, and the server system 110 may include configuration profiles 180 for these configurations and use them if desired to obtain a network with a number of nodes matching a certain number or in a certain range.

After a configuration is selected for each user, the management module 112 allocates a set of nodes to have the selected topology. The management module 112 also sets values of the interconnects for the network to have the desired interconnect scheme. These settings can be specified in an appropriate stored configuration profile 180 for the desired configuration. The node networks can each use routing tables to pass information among the nodes in the network. As part of initializing a network, the management module can access stored data, e.g., routing tables 182, that specifies the routing parameters for each node in a network, to populate the routing table for each node of each network allocated. Each configuration profile 180 can have a corresponding set of routing tables 182 that are used for the respective nodes of the configuration.

The configuration profiles 180 may indicate switching instructions 114 to accomplish the outlined port interconnections. These switching instructions may be in the form of multiplexer control inputs (e.g., that each receive a bit of 1 or 0) or may be expressed in other forms. The switching instructions 114 may include a set of instructions for each node in the group of nodes allocated, if all nodes have reconfigurable connections for their data ports. In other implementations, segments of a certain size (e.g., slices of 4×4 nodes or cube-shaped blocks of 4×4×4 nodes) may use a fixed (e.g., hardware-defined, non-switchable) interconnect within the segment, and reconfiguration is supported only at the edges or outer faces of the segment. In these implementations, the switching instructions 114 may include settings for only the outer data ports that are made reconfigurable with switching devices 116.

The management module 112 may provide the switching instructions 114 to switching devices 116. The switching devices 116 may include, for example, at least one switching device corresponding to each of the nodes that has a data port configured to permit reconfigurability. For example, if standard segments of 4×4×4 nodes are used, then each standard-sized segment has 64 nodes, and there are 6 faces to the cube, with each face having 16 nodes and thus 16 available data ports for interconnections. Although each of the nodes has at least six data ports, the nodes near the center of the cube have all six data ports connected with neighboring nodes in the predetermined (and potentially fixed) mesh connections. Nodes at the outer faces of the cube have one or more available data ports (e.g., where the nodes do not have a neighbor along one of the X, Y, or Z dimensions) that can be used to form interconnections with nodes at other faces of the same segment or with nodes at the outer face of a different segment. The switching devices 116 may be optical switches, e.g., switches for data-carrying optical signals.

As a result, the management module 112 allocates and initializes the network for each user, e.g., by allocating or reserving specific nodes in the cluster 111, setting the switching devices 116 to provide the desired interconnect scheme, setting the routing tables 182 appropriate for the selected configuration profile 180. The server system 110 then provides the users to the networks allocated for them. In other words, the system 110 concurrently provides the two users access to separate, distinct networks within the cluster 111, where the two networks can have different numbers of nodes, node topologies, and interconnect schemes to best meet the needs of the user's workload.

After the node networks for the users are allocated and initialized, the management module 112 may determine application instructions 118 to run an application 120. The application instructions 118 may be extracted from the request 106a, 106b or generated from a request. The application 120 then carry out the task corresponding to the request 106a, 106b. As a result of running the application 120, results 122a, 122b are generated. The results 122a, 122b may be sent by the server 110 to the respective client devices 104a, 104b over the network 140.

FIG. 2A is a diagram showing an example of a torus configuration of interconnections for an 8×4×1 topology. FIG. 2A shows a node network 200 having an 8×4 configuration of nodes and a torus interconnect arrangement. The network 200 is built from two 4×4 sub-meshes 210a, 210b that have a mesh interconnection within each sub-mesh and also at the boundary of the two sub-meshes 210a, 210b. Wraparound connections, wrapping around in the Y dimension (shown vertically) and in the X dimension (shown horizontally) complete the torus topology.

The network 200 represents a small subset of the much larger cluster 111 of processing nodes. Connections between at least some of the nodes can be changed using the switches in the reconfigurable interconnect fabric. In some implementations, one or more connections to each node may be reconfigurable by switches. In other implementations, only a subset of connections are reconfigurable and/or only a subset of the nodes have any reconfigurable connections. For example, network segments of 4×4 nodes, e.g., the two submeshes 210a, 210b, may be multi-node units within the cluster 111 that have fixed mesh connections within the segment but reconfigurable connections at the edges. Whichever implementation is used, reconfigurable switching hardware is used to set the connections (i) between the two submeshes 210a, 210b in the X dimension where the submeshes are adjacent, (ii) for the X-dimension wraparound connections, which also connect the submeshes, and (iii) for the wraparound connections in the Y dimension, which connect each submesh back to itself in this torus arrangement. The connections that carry data between nodes can be electrical connections, optical connections, or connections through another data carrying medium. In some implementations, the reconfigurable connections are switched optical data connections, and the mesh connections within a submesh may or may not be optical connections.

The diameter of the network 200 is 6 hops. In the torus configuration, the links that wrap around in the Y dimension do not vary in position along the X dimension. For example, the wraparound connection 220 extends from the node 221 at position (0, 3) to the node 222 at position (0, 0).

FIG. 2B is a diagram showing an example of a twisted torus configuration of interconnections for an 8×4×1 topology. FIG. 2B shows a node network 250 having the same 8×4 configuration of nodes as before, but with a twisted torus interconnect arrangement for those nodes. The network 250 includes two 4×4 sub-meshes 260a, 260b having a mesh interconnect within each sub-mesh and also at the boundary of the two sub-meshes 260a, 260b. As with the node network 200, the node network 250 is an example of one of the many different networks that can be allocated in the cluster 111 and used in parallel with other networks that are separately allocated to other users.

The difference from the previous diagram is a rewiring of the Y-dimension wraparound connections using the switches of the reconfigurable interconnect fabric. In the network 250, connections that wrap around in the Y dimension also provide an offset in the X dimension, specifically an X-direction increment by 4. As a result, a connection 270 from node 271 at position (0, 3) wraps around in the Y dimension and shifts+4 in the X direction to reach node 272 at position (4, 0). This Y-dimension twist is stated as "Y: X+4", meaning that for Y-dimension wraparound links, the system also increments the X coordinate by 4.

To account for an X-direction wraparound that may occur by incrementing by four, the system uses a modulo operation, to determine the remainder that results from dividing by the length of the network 250 in the X direction, which is 8 in this example. For example, from node 271, the system (i) starts with the X value of 0, (ii) increments by 4, then (iii) computes 4 mod 8=4, with the modulo result (e.g., remainder of dividing by 8 in this case) as the X value for the other end of the connection 270. For another node 273 at position (5, 3), the system would increment the value of X by 4, compute 9 mod 8=1, and then use the modulo result as the X value for the node at the other end of the connection, e.g., node 274 at position (1, 0).

When all of the Y-direction wraparound links are made in this manner, the resulting 8×4 twisted torus is completely symmetric. Also, the diameter of the network 250 is 4 hops, which is a reduction compared to the non-twisted torus configuration.

The system determines whether the twisted torus configuration should be used, the amount of twist, and the dimension(s) in which to add the twist based on the number of nodes and the arrangement. For example, the system adds a twist when the node arrangement has different sizes for different dimensions. A square arrangement (e.g., 4×4, 8×8, etc.) or cube arrangement (e.g., 4×4×4, 8×8×8, etc.) is balanced and does not need any twist to achieve symmetry.

On the other hand, when the arrangement is longer in one dimension than another (e.g., 8×4, 16×8, 8×4×4, 8×8×4, etc.) the standard torus wraparound in the longest direction connects a series of nodes that is greater than the wraparounds in the shorter direction(s).

For example, in FIG. 2A, the X-direction wraparound links wrap around a span of 8 nodes, so it would be 8 hops to travel around an entire row in the X direction and arrive at the starting node. On the other hand, the Y-direction wraparound links wrap around a span of 4 nodes, and so it would be only four hops to travel around in the Y direction. This shows the asymmetry for data transfer when a network with different sized sides is used. The twist is used to compensate for the asymmetry. For example, in FIG. 2B, the offset of four in the X direction (which is half the length of the network 250 in the longest dimension, the X dimension) increases the length of a cycle that moves along the Y direction. Starting at the node (0,0) and moving up in the Y direction leads to node 271 at position (0, 3), and the connection 270 leads to node 272 at position (4, 0); continuing to increase in the Y direction another four steps reaches node (0, 0) through another twisted wraparound link. Thus, the twist increased the length of a cycle for Y-direction to 8 hops, the same as the length of an X-direction cycle, to provide full symmetry to the network 250.

In general, the system adds twists to the wraparound links in each of the dimensions that are less than the dimension with the largest size. This effectively increases the cycle length for the shortest dimensions to be closer to or equal to the cycle length for the largest dimension. This technique can be used for many different node arrangements, but it works especially well when the largest dimension is a multiple of the smaller dimensions. For example, in FIG. 2B, the node topology is 8×4, and the size in the X dimension is twice the size of the Y dimension. As a result, routing the Y-dimension wraparound links to create Y-dimension cycles that each pass through two columns creates the desired level of symmetry. As another example, for a topology of 12×4, the size in the X dimension is three times the size in the Y dimension. The twist in the wraparound for the Y dimension can have an X dimension offset of 4 units, so that three columns of four nodes are connected together, so that moving in the Y direction provides a cycle of 12 hops, equivalent to the length of the X-dimension cycles.

The examples of FIGS. 2A and 2B show two-dimensional node topologies (e.g., there is only one node in the Z dimension), the same techniques can be used for topologies of 3, 4, 5 or more dimensions. For example, for a three-dimensional node topology, a twist or offset can be provided for the wraparound connections for any or all dimensions which have a size less than the largest size of the dimensions. For example, if a three-dimensional topology is largest in the X dimension and smaller in the Y and Z dimensions, then a twist can be included for the wraparound connections of both the Y and the Z dimensions.

Following the notation discussed above, some examples of torus and twisted-torus connectivity are provided below. The examples emphasize the settings for the reconfigurable switches, which can be provided using optical switching, electrical switching, or other techniques. The examples involve networks composed of units that are multiples of four, e.g., 4×4 sheets or 4×4×4 cubes. This allows the range of reconfigurability that the interconnect system needs to support to be limited, e.g., to be able to provide offsets and shifts that are multiples of four rather than every possible increment. This reduces the amount of switching hardware needed and can increase physical density of the system. As a result, in the three-dimensional examples in FIGS. 3A-3B, 4A-4B, a specific 4×4×4 segment is referred to using the lexicographically smallest node coordinates within that segment. In these examples, there are two segment faces for each dimension of the network, referred to as D[in] and D[out], where D is the dimension: X, Y, or Z. In other words, at the exterior of the 3D topology (e.g., a rectangular prism shape) there are six total faces: one oriented facing toward the increasing X direction, one facing toward the decreasing X direction, one oriented facing toward the increasing Y direction, one facing toward the decreasing Y direction, one oriented facing toward the increasing Z direction, and one facing toward the decreasing Z direction.

When limiting the size of the topology to be a multiple of four, and thus using 4×4×4 units to compose each network topology, the face or side of each 4×4×4 unit exposes 16 processing nodes, each of which has an available data port (e.g., a bidirectional data port) that can be assigned outside the unit. As a result, each face of a 4×4×4 segment has 16 data ports. When two segments are adjacent to each other, a face-to-face connection is created using the reconfigurable switches, each of the 16 individual data ports on one face are connected to the ports in the same relative position on the adjacent face of the neighboring unit. Only faces in the same orientation are connected. For example, for two network segments aligned along the X dimension, the face of the first segment that faces toward the increasing X direction would have each of its nodes connected to the adjacent nodes of the face of the second segment that faces toward the decreasing X direction, forming a 8×4×4 network.

Figure 3B:
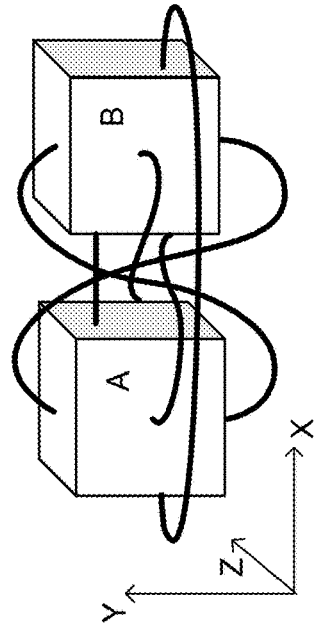
FIG. 3B is a diagram showing connections for an example of a twisted torus configuration of interconnections for an 8×4×4 topology.
Figure 3A:
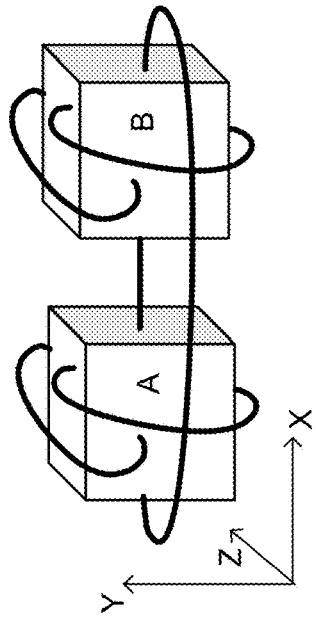
FIG. 3A is a diagram showing connections for an example of a torus configuration of interconnections for an 8×4×4 topology.

FIG. 3A is a diagram 300 showing connections for an example of a torus configuration of interconnections for an 8×4×4 topology of nodes. This configuration is composed of two 4×4×4 network units, labeled A and B, that are aligned along the X dimension. In this arrangement, the topology is longest in the X dimension (e.g., 8 nodes), and shorter in the Y and Z dimensions (e.g., 4 nodes each).

A table 300 illustrates an example of a wraparound connection in the torus. For simplicity, only the connections for each face of the 4×4×4 segments are shown. Each row in the table 300 represents the connection between a pair of faces. Each row represents 16 node connections, because there are 16 nodes at each face being connected. The [in] face segments and [out] face segments refer to the coordinate for the lower left node of each segment. For example, (0,0,0) refers to segment A, and (4,0,0) refers to segment B.

The 3D torus interconnect provides wraparound connections for each dimension with no offsets or increments in other dimensions, so the cycle lengths when moving in the X, Y, and Z directions are 8, 4, and 4 respectively. For example, the first row in the table 300 shows that the left face of segment A (e.g., "$A_{-X}$" or the face of segment A that faces the decreasing X direction) connects to the right face of segment B (e.g., "$B_{+X}$" or the face of segment B that faces the increasing X direction). The second row shows that the left face of segment B connects to the right face of segment A, and so on. For the wraparound connections in the Y and Z dimensions, each segment's faces in that direction connect to each other, e.g., $A_{-Y}$ connects with $A_{+Y}$, $A_{-Z}$ connects with $A_{+Z}$, $B_{-Y}$ connects with $B_{+Y}$, and $B_{-Z}$ connects with $B_{+Z}$.

FIG. 3B is a diagram 350 showing connections for an example of a twisted torus configuration of interconnections for an 8×4×4 topology of nodes. Compared to the interconnections of FIG. 3A, the X dimension connections are unchanged, but the connections for the Y and Z dimensions have twists added. Following the wraparound connections for the Y and Z dimensions now passes through both segments A and B rather than a single segment. The cycle lengths when moving in the X, Y, and Z directions each have a length of 8. For the wraparound connections in the Y and Z dimensions, each segment's faces in that direction connect not to the same segment but the other segment, e.g., $A_{-Y}$ connects with $B_{+Y}$, $A_{-Z}$ connects with $B_{+Z}$, $B_{-Y}$ connects with $A_{+Y}$, and $B_{-Z}$ connects with $A_{+Z}$.

Figure 4A:
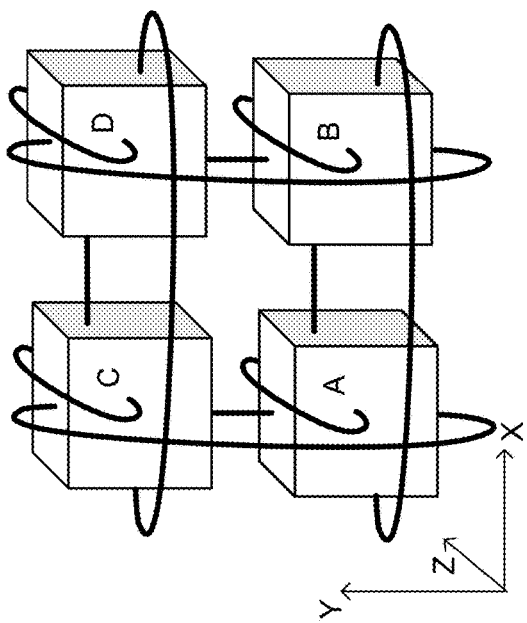
FIG. 4A is a diagram showing connections for an example of a torus configuration of interconnections for an 8×8×4 topology.

FIG. 4A is a table 400 showing connections for an example of a torus configuration of interconnections for an 8×8×4 topology. This configuration has four 4×4×4 network segments, labeled A, B, C, and D, that are aligned with two adjacent to each other along the X dimension and two more aligned above in the Y dimension. The configuration is described using the same notation discussed above for FIGS. 3A-3B, with each connection between faces representing 16 individual bidirectional connections between the nodes of the faces being made by the reconfigurable switching interconnect fabric.

Figure 4B:
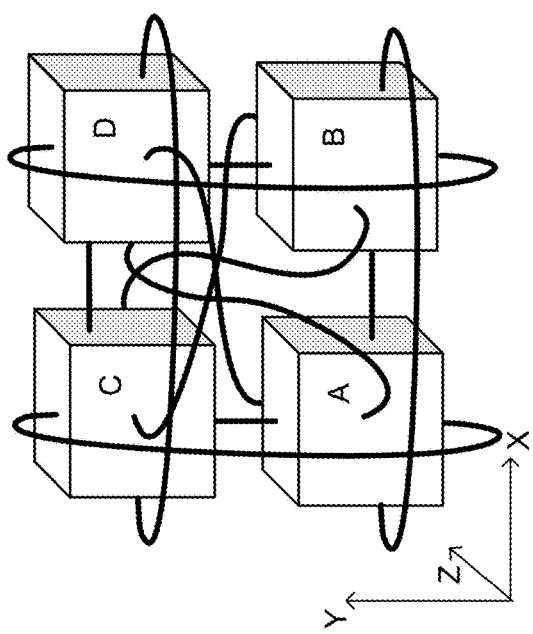
FIG. 4B is a diagram showing connections for an example of a twisted torus configuration of interconnections for an 8×8×4 topology.

FIG. 4B is a table 450 showing connections for an example of a twisted torus configuration of interconnections for an 8×8×4 topology. In the 8×8×4 configuration the longest size in any dimension is 8 nodes, and both the X and Y dimensions have this size. As a result there is no twist needed for the wraparound links in the X and Y dimensions. However, the Z dimension is shorter, and so a twist is added in both the X and Y dimensions for the Z wraparound links. As a result, the Z wraparound connections are incremented by four in both the X and Y dimensions. All of the Z wraparound links then form cycles of 8 nodes by spanning two different segments.

The same techniques can be used for other configurations. For example, in a 12×4×4 configuration there would be three 4×4×4 segments, and twist could be added for the Y and Z directions so that each cycle passes through all three segments in order to increase the cycle length to be equal to the X-dimension cycle length of 12. Passing the connections through the Various examples use network segment blocks of 4×4×4, but other sizes can be used, e.g., 2×2×2, 3×3×3, 8×8×8, etc. In addition, in some cases a network may support full configurability so that networks are built of individual nodes rather than multi-node segments or blocks.

FIG. 5 is a table 500 showing example twist parameters for sizes of processing node networks. The system 100 discussed above can use the twisted torus configuration for various node topologies to provide more efficient networks of processing nodes. In some implementations, the switching networks among the processing nodes are not arbitrarily flexible (e.g., do not support every possible twist or configuration), but do support twists where the increment along dimensions meets some criterion, such as being multiple of two, being a four, or other parameter that the system is designed to support.

The switches that provide the ability to provide or change the twist for wraparound links allow the system to handle some important cases, illustrated in the table, and include twists to make the networks symmetric. The first case is the two-dimensional network in which on dimension is twice the other, e.g., 2k×k. In this case, the twist is the length k of the smaller length (e.g., half the larger length). The second case is a three-dimensional network of 2k×k×k, and both the Y and Z dimension wraparounds are twisted by incrementing the X dimension coordinate by k. In the third case, a 2k×2k×k network, only the Z dimension wraparound is twisted, but values in both X and Y dimensions are incremented during the twist.

In some implementations, the system 100 imposes constraints on the value of k, which can allow for simpler and more efficient implementation of the switching interconnect fabric by reducing the need to support as many configurations. For example, the system 100 may limit k to be a multiple of two, a multiple of four, etc. By limiting the values of k, the system limits the amounts or types of increments that the system 100 needs to support in the interconnect fabric, as well as the amount or type of twist that is permitted. For example, limiting k to multiples of four also limits the twist amounts to increments in multiples of four.

Routing of data within twisted torus networks can be performed similar to routing in traditional torus networks. Routes can be expressed as a number of signed (e.g., direction-indicated) hops in the X, Y, and Z dimensions of the network with the sign selecting the direction (e.g., +X vs. −X) A less obvious aspect of routing is how a given source-destination pair is translated into a set of X, Y, Z hops so that the resulting route is minimal. The routing can be table-based, with each node having a corresponding routing table for connections in different directions. The routes can be computed in advance and store (e.g., using Dykstra's algorithm) and then loaded by the system into the routing tables at initialization time. The selection and retrieval of routing information can be performed as part of initializing a node network for use by a user.

Another technique that can be used is virtual channels to avoid deadlock. The system can populate the twisted-torus routing tables with dimension order routes, indicating which of the dimensions to travel in in which order. The system can follow a simple dateline rule to avoid deadlocks: the packet virtual channel is incremented when traveling over a wraparound link and reset to zero when changing dimensions. For example, even though the "X" links may connect to a node whose coordinates differ in X and in other dimensions (due to twisting), this basic dateline approach is sufficient to avoid deadlock.

One subtle routing issue is that for some source-destination pairs, there are multiple minimal routes. The canonical example occurs in a torus network occurs when routing exactly halfway around any of the torus dimensions (e.g., 4 hops in a torus dimension of 8 nodes). One way to achieve load balance in this case is to randomize the routes, e.g., half the routes travel around the ring in one direction, half travel in the other direction. In general, if there are multiple minimal routes, the system can choose among them with equal probability.

In some implementations, instead of randomizing routes (e.g., when route randomization is not available), the system can vary the routing tables for each node in an attempt to improve load balance. In the torus, there are simple strategies that are effective, such as to choose the direction of routing in a ring for the halfway case by using the least significant bit of the source node coordinate in that ring. This strategy exactly load balances uniform random traffic.

It's less obvious how to derandomize the twisted tori torus routes in a simple way. This problem can be assessed as an integer linear program and the system can attempt to minimize the maximum channel load under a uniform random traffic model. This computation reveals that it is not always possible to achieve perfect load balance in twisted tori with deterministic routing tables, but the system can get very close.

FIG. 6 is a table 600 showing different node and interconnect configurations and related characteristics.

The table 600 compares the performance of several practical-sized 3D torus and 3D twisted torus topologies. A uniform random traffic pattern is used as a proxy to model the all-to-all patterns found in sparse embedding workloads. For this pattern, packets are sent between all source-destination pairs with equal probability. Averaging over all pairs yields an average hop count and a maximum average channel load. For twisted tori, the table 600 shows the maximum average channel load for both randomized and deterministic routing.

FIG. 7 is a table 700 showing different node configurations and uniform random bandwidth measures of twisted torus interconnections compared to standard torus interconnections. In a bandwidth-limited scenario, the time to send a batch of uniform random packets is inversely proportional to the maximum average channel load. In a 8×4×4 network, for example, this translates to a speedup of 1.0/0.578=~1.73 for the twisted torus over the non-twisted torus.

Twisted tori do not offer an asymptotic advantage over traditional tori. As the configuration is expanded to contain more chips, it oscillates between cubical (e.g., 4×4×4) and non-cubical (e.g., 8×8×4) arrangements. The non-cubical configurations can be seen as intermediate steps between two cubical configurations that differ by a factor of 8 in the number of processing nodes. The twisted tori only outperform the traditional tori for these intermediate configurations, but the advantages can be quite significant for those intermediate configurations. Twisted tori also eliminate abrupt changes in network performance as a function of incremental changes in configuration size.

These performance measures show that twisted tori can improve the usability and efficiency of the network allocated from among the cluster 111. Configuration size can be chosen to best fit the compute and capacity requirements of the workload and the network performance scales gracefully with that size. There are fewer "sharp corners" or stepped changes in performance along the range of node sizes.

FIG. 8 is a table 800 showing various node network configurations and related properties.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
providing a cluster of processing nodes coupled using a reconfigurable interconnect fabric;
determining (i) a number of processing nodes to allocate as a network within the cluster and (ii) a topology for the network, the topology having a length in each of multiple dimensions;
selecting an interconnection scheme for the network, wherein the interconnection scheme is selected from a group that includes at least a torus interconnection scheme and a twisted torus interconnection scheme, wherein the selected interconnection scheme is a twisted torus interconnection scheme;
allocating processing nodes for the network by allocating the determined number of processing nodes of the cluster in the topology;
setting the reconfigurable interconnect fabric to provide the twisted torus interconnection scheme among the processing nodes allocated for the network, wherein the provided twisted torus interconnection scheme has an amount of twist that is selected based on the lengths of the topology, and wherein the provided twisted torus interconnection scheme applies an offset for the twist to one or more of the dimensions that are selected based on the lengths of the topology; and
providing access to the network for performing a computing task.

2. The method of claim 1, wherein selecting the interconnection scheme comprises selecting between the torus interconnection scheme and the twisted torus interconnection scheme based on the determined number of processing nodes.

3. The method of claim 2, wherein the selected topology has a first size in a first dimension and a second size in a second dimension; and
wherein selecting the interconnection scheme comprises selecting the twisted torus interconnection scheme based on determining that the first size is a multiple of the second size.

4. The method of claim 1, wherein the topology for the network comprises an arrangement of nodes that extends along the multiple dimensions and includes multiple nodes along each of the multiple dimensions, wherein the topology has different amounts of nodes along at least two of the multiple dimensions; and
wherein selecting the interconnection scheme comprises selecting the twisted torus interconnection scheme such that the network is symmetric.

5. The method of claim 4, wherein the twisted torus interconnection scheme includes wraparound connections made using switching elements of the reconfigurable interconnect fabric; and
wherein wraparound connections connect nodes or edges of the network that face opposite directions along a same dimension, wherein the wraparound connections for a first dimension in which the network is longest do not include any offsets in other dimensions, and wherein the wraparound connections for a second dimension in which the network is shorter than the first dimension has an offset in the first dimension.

6. The method of claim 5, wherein the wraparound connections for the second dimension are each determined by connecting a starting node with an ending node that has:
(i) a position in the second dimension that is the same as the starting node, and
(ii) a position in the first dimension that is equal to a result of a modulo operation involving (a) a sum of a position of the starting node in the first dimension and a predetermined twist increment determined based on the topology and (b) a length of the longest dimension.

7. The method of claim 1, wherein the topology is a two-dimensional topology.

8. The method of claim 1, wherein the topology is a three-dimensional topology.

9. The method of claim 1, wherein the cluster of processing nodes comprises multiple segments having a predetermined size and arrangement of multiple processing nodes, the segments having mesh connections between the nodes in each segment; and
wherein the reconfigurable interconnect fabric comprises switching elements to permit dynamic, programmable reconfiguration of connections for external-facing data ports of processing nodes in each segment.

10. The method of claim 9, wherein the segments are each a 4×4×4 group of processing nodes.

11. The method of claim 1, wherein the processing nodes are each separate application specific integrated circuits (ASICs).

12. The method of claim 1, wherein the reconfigurable interconnect fabric comprises switches for data-carrying optical signals.

13. The method of claim 1, wherein the computing task comprises training a machine learning model.

14. The method of claim 1, comprising:
storing multiple configuration profiles specifying different configurations of the reconfigurable interconnect fabric to connect subsets of the processing nodes in the cluster; and
selecting a configuration profile from among the multiple configuration profiles;
wherein switching elements of the reconfigurable interconnect fabric are set according to the selected configuration profile.

15. The method of claim 14, comprising initializing routing tables for processing nodes in the network based on stored routing information corresponding to the selected configuration profile.

16. The method of claim 1, comprising allocating distinct networks of processing nodes in the cluster for different users, the distinct networks having different interconnection schemes.

17. A system comprising:
one or more computers; and
one or more computer-readable media storing instructions that are operable, when executed by the one or more computers, to cause the one or more computers to perform operations comprising:
providing a cluster of processing nodes coupled using a reconfigurable interconnect fabric;
determining a number of processing nodes to allocate as a network within the cluster and iii) a topology for the network, the topology having a length in each of multiple dimensions;
selecting an interconnection scheme for the network, wherein the interconnection scheme is selected from a group that includes at least a torus interconnection scheme and a twisted torus interconnection scheme, wherein the selected interconnection scheme is a twisted torus interconnection scheme;
allocating processing nodes for the network by allocating the determined number of processing nodes of the cluster in the topology;
setting the reconfigurable interconnect fabric to provide the twisted torus interconnection scheme among the processing nodes allocated for the network, wherein the provided twisted torus interconnection scheme has an amount of twist that is selected based on the lengths of the topology, and wherein the provided twisted torus interconnection scheme applies an offset for the twist to one or more of the dimensions that are selected based on the lengths of the topology; and
providing access to the network for performing a computing task.

18. One or more non-transitory computer-readable media storing instructions that are operable, when executed by one or more computers, to cause the one or more computers to perform operations comprising:
providing a cluster of processing nodes coupled using a reconfigurable interconnect fabric;
determining (i) a number of processing nodes to allocate as a network within the cluster and (ii) a topology for the network, the topology having a length in each of multiple dimensions;
selecting an interconnection scheme for the network, wherein the interconnection scheme is selected from a group that includes at least a torus interconnection scheme and a twisted torus interconnection scheme, wherein the selected interconnection scheme is a twisted torus interconnection scheme;
allocating processing nodes for the network by allocating the determined number of processing nodes of the cluster in the topology;
setting the reconfigurable interconnect fabric to provide the twisted torus interconnection scheme among the processing nodes allocated for the network, wherein the provided twisted torus interconnection scheme has an amount of twist that is selected based on the lengths of the topology, and wherein the provided twisted torus interconnection scheme applies an offset for the twist to one or more of the dimensions that are selected based on the lengths of the topology; and
providing access to the network for performing a computing task.

* * * * *